US012258225B2

(12) United States Patent
Marx et al.

(10) Patent No.: US 12,258,225 B2
(45) Date of Patent: Mar. 25, 2025

(54) SYSTEM AND METHOD FOR AUTOMATED ASSEMBLY OF COMPONENTS

(71) Applicant: KUKA Systems North America LLC, Sterling Heights, MI (US)

(72) Inventors: Timothy James Marx, Macomb, MI (US); Thomas William French, Petersburg, MI (US); Aaron K. Kinsella, Sterling Heights, MI (US); Thomas Jon Nieman, Shelby Township, MI (US); Scott McIsaac, Waterford, MI (US); Craig Richard Nilson, Macomb, MI (US); Kenneth Michael Boulan, Sterling Heights, MI (US); Jason Edmunn Messner, Allenton, MI (US)

(73) Assignee: KUKA Systems North America LLC, Sterling Heights, MI (US)

( * ) Notice: Subject to any disclaimer, the term of this patent is extended or adjusted under 35 U.S.C. 154(b) by 729 days.

(21) Appl. No.: 17/171,688

(22) Filed: Feb. 9, 2021

(65) Prior Publication Data
US 2021/0309466 A1 Oct. 7, 2021

Related U.S. Application Data

(60) Provisional application No. 63/006,491, filed on Apr. 7, 2020.

(51) Int. Cl.
B65G 47/91 (2006.01)
B62D 65/06 (2006.01)
B25J 15/06 (2006.01)

(52) U.S. Cl.
CPC ........... *B65G 47/918* (2013.01); *B62D 65/06* (2013.01); *B65G 47/914* (2013.01); *B25J 15/0616* (2013.01); *B65G 2811/0663* (2013.01)

(58) Field of Classification Search
CPC .... B65G 47/914; B65G 47/918; B62D 65/06; B25J 15/0616
See application file for complete search history.

(56) References Cited

U.S. PATENT DOCUMENTS

2012/0213623 A1 8/2012 Hariki et al.
2015/0209964 A1 7/2015 Akama
(Continued)

OTHER PUBLICATIONS

U.S. Patent Office; Search Report and Written Opinion in related International Patent Application No. PCT/US2021/025983 dated Jul. 8, 2021; 9 pages.

*Primary Examiner* — Saul Rodriguez
*Assistant Examiner* — Willie W Berry, Jr.
(74) *Attorney, Agent, or Firm* — Dorton & Willis, LLP

(57) ABSTRACT

A system for automatically handling components to be assembled onto a product on an assembly line includes a carriage that is movable to and between a first, retracted position spaced from the assembly line, and a second position displaced from the retracted position in a direction toward the assembly line. A manipulator on the carriage supports a component mounting tool configured to receive and support at least one component for assembly to the product. The manipulator may be arranged in a first orientation when the carriage is in the first position, and may be pivoted to a second orientation when the carriage is in the second position, such that a component on the component mounting tool is supported in a pose for processing when the carriage is in the first position, and is supported in a pose for joining to the product when the carriage is in the second position.

15 Claims, 7 Drawing Sheets

(56) References Cited

U.S. PATENT DOCUMENTS

2016/0039062 A1  2/2016  Nakahata et al.
2016/0137435 A1* 5/2016  Tanaka .................. B65G 65/00
                                                414/800
2018/0194016 A1  7/2018  Nakanishi

* cited by examiner

SYSTEM AND METHOD FOR AUTOMATED ASSEMBLY OF COMPONENTS

CROSS-REFERENCE TO RELATED APPLICATIONS

This application claims the benefit of priority to U.S. Provisional Application Ser. No. 63/006,491, filed Apr. 7, 2020 (pending), the disclosure of which is incorporated by reference herein in its entirety.

TECHNICAL FIELD

The present invention relates generally to automated manufacturing systems and, more particularly, to a system and method for automated assembly of components.

BACKGROUND

Automation plays an ever-increasing role in the manufacturing and assembly of products. As manufacturing systems become more and more automated, there is a corresponding increased use of robotic manipulators to fabricate, process, and assemble components and sub-assemblies into end products. One example of such automated manufacturing systems can be found in the automotive industry, where automated manufacturing lines assemble completed vehicles from component parts. Many automated manufacturing systems utilize assembly lines having multi-axis robotic manipulators cooperating in a coordinated manner to process and assemble components into a desired end product. Typically, these multi-axis robotic manipulators comprise a plurality of serially arranged links that are moved by motors to perform the processing and assembly functions.

As these manufacturing systems have become more automated, the tolerances between assembled components have become smaller and smaller. While conventional six degree-of-freedom manipulators provide flexibility needed for these highly automated manufacturing systems, the configuration of robotic manipulators with serially arranged links results in looser tolerances in the assembled components, or requires that the robotic manipulators are frequently calibrated to ensure that close tolerances can be achieved and maintained. Accordingly, there is a need for improved automated systems that facilitate quick, efficient, and repeatable assembly of components into end products, and which overcome these and other drawbacks of current automated manufacturing systems.

SUMMARY

The present invention provides a system and associated method for the automated assembly of components to a workpiece on an assembly line. While the invention will be described in connection with certain embodiments, it will be understood that the invention is not limited to these embodiments. Rather, the invention includes all alternatives, modifications, and equivalents as may be included within the spirit and scope of the present disclosure.

In one aspect, an exemplary system for automatically handling components to be assembled onto a product on an assembly line includes a carriage supported on a frame that positions the system adjacent the assembly line. The carriage is movable to and between a first, retracted position spaced a distance away from the assembly line, and a second, work position displaced from the retracted position in a direction toward the assembly line. The carriage supports a multi-axis articulating manipulator that, in turn, supports a component mounting tool configured to receive and support at least one component for assembly to the product. The manipulator may be arranged in a first orientation when the carriage is in the first position, and may be pivoted to a second orientation when the carriage is in the second position such that a component on the component mounting tool is supported in a pose for processing when the carriage is in the first position, and the component is supported in a pose for joining to the product when the carriage is in the second position.

In another aspect, a method of handling components to be assembled to a product on an assembly line includes receiving the component on a component mounting tool at a first, retracted position spaced from the assembly line, and moving the component mounting tool in a direction toward the assembly line to a second, work position. In the first position, the component mounting tool is in a first pose adapted to facilitate receiving or processing the component. In the second position, the component mounting tool is in a second pose adapted to facilitate joining the component to the product.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
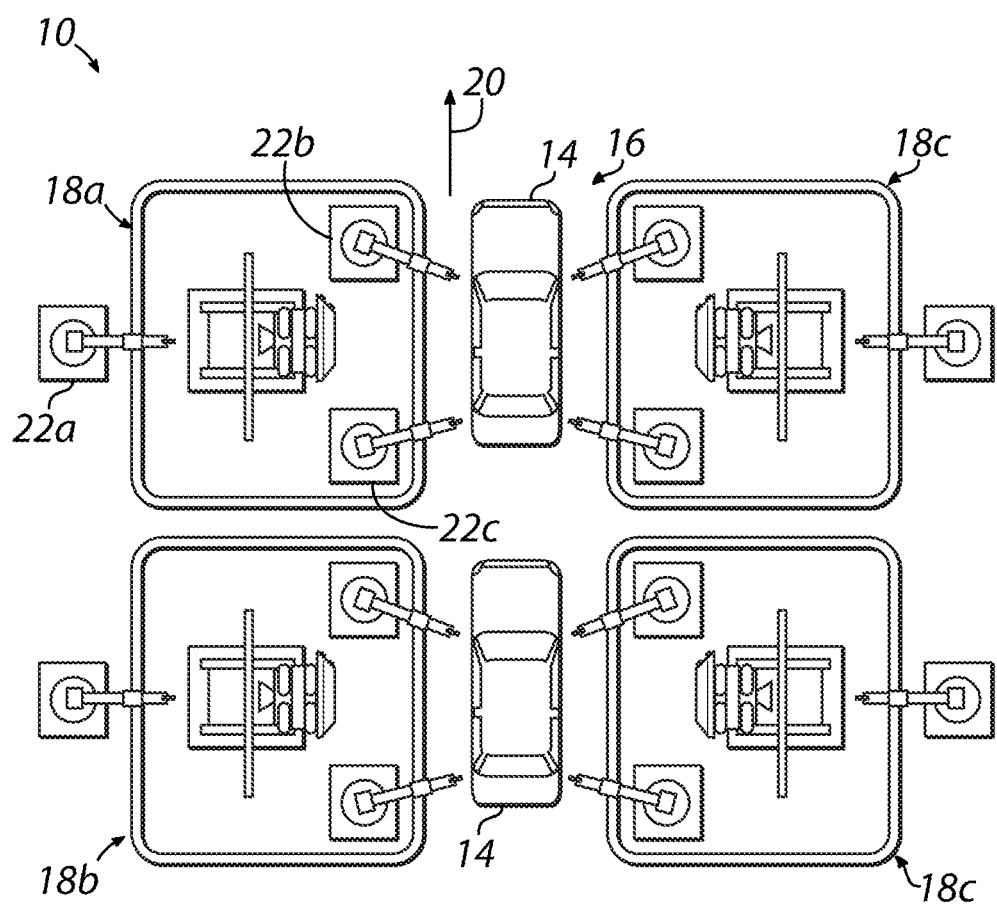
FIG. 1 is a schematic plan view of an exemplary manufacturing plant including a system for handling components in accordance with the principles of the present disclosure.

FIG. 1 depicts an exemplary manufacturing plant 10 including an exemplary system 12 for automatically handling components to be assembled onto a workpiece 14 that is moved along a manufacturing assembly line 16 in accordance with the principles of the present disclosure. In the embodiment shown, the manufacturing plant 10 comprises a plurality of individual manufacturing cells 18a, 18b, 18c, 18d positioned adjacent the manufacturing assembly line 16 and disposed on either side of the assembly line 16. The assembly line 16 may include conveying structure (not shown) for automated movement of workpieces 14 along the assembly line 16 (such as in the direction of arrow 20), whereby the workpieces 14 may be positioned adjacent the plurality of manufacturing cells 18a-18d and automated systems, such as robotic manipulators, may assemble components onto the workpieces 14 or process the workpieces 14 as part of the manufacturing process. In the embodiment shown, the workpieces 14 are depicted as automotive vehicles, and the cells 18a-18d of the manufacturing plant 10 are configured to assemble components onto the vehicle body or to perform various processing steps which may be desired. While the exemplary embodiment is shown and described herein as a manufacturing plant 10 with cells 18a-18d adapted to assemble and process vehicles, it will be appreciated that the manufacturing plant 10 and cells 18a-18d may alternatively be configured to produce various other products.

With continued reference to FIG. 1, an exemplary manufacturing cell 18a may include an exemplary component handling system 12 in accordance with the principles of the present disclosure. The component handling system 12 may be arranged in the cell 18a adjacent a plurality of robotic manipulators. For example, a first robotic manipulator 22a may be configured to pick one or more components from a supply (not shown) and position the components on or within the component handling system 12. The first robotic manipulator 22a may be situated within the manufacturing cell 18a or, alternatively, may be placed adjacent the manufacturing cell 18a and may be configured to extend within the manufacturing cell 18a in cooperation with the component handling system 12. Additional robotic manipulators 22b, 22c may be positioned within the cell 18a and may be configured to cooperate with the component handling system 12 to facilitate the assembly of and/or processing of components that are positioned by the component handling system 12 for assembly onto the workpiece 14. While the exemplary manufacturing cell 18a has been shown and described herein as including several robotic manipulators 22a, 22b, 22c which cooperate with the component handling system 12, it will be appreciated that various other configurations of manufacturing cells may alternatively be used.

Figure 2:
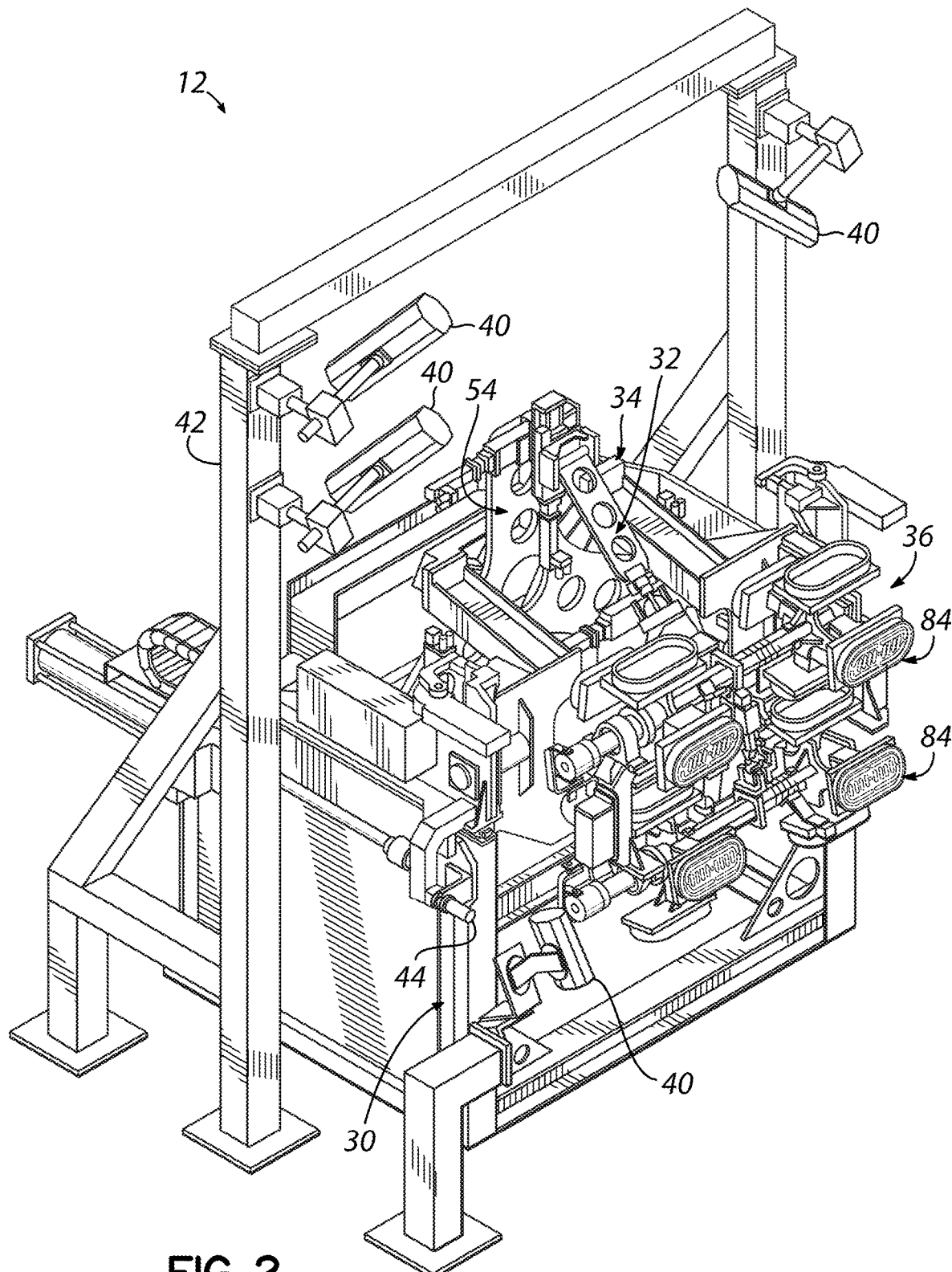
FIG. 2 is a perspective view of an exemplary system for handling components in accordance with the principles of the present disclosure.
Figure 3A:
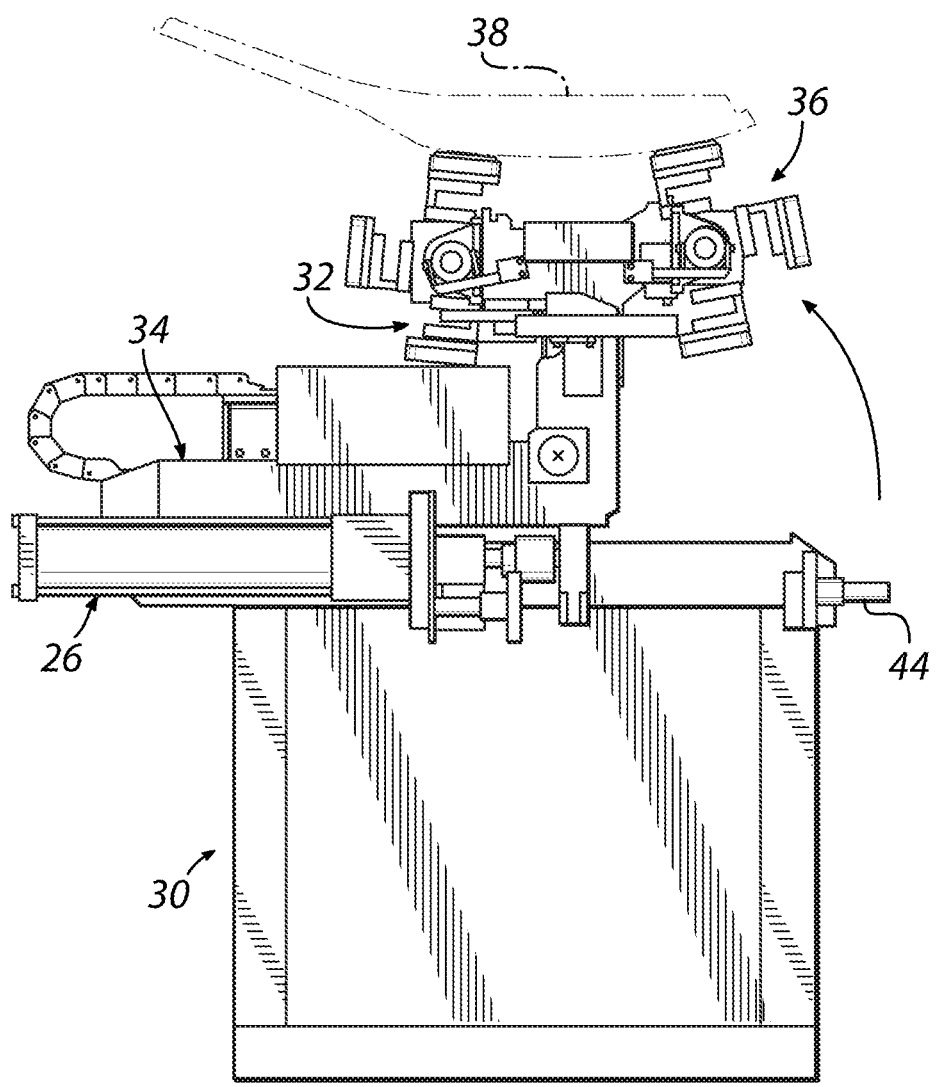
FIG. 3A is a partial elevation view of the system of FIG. 2, illustrating a carriage supported in a first, retracted position.
Figure 3B:
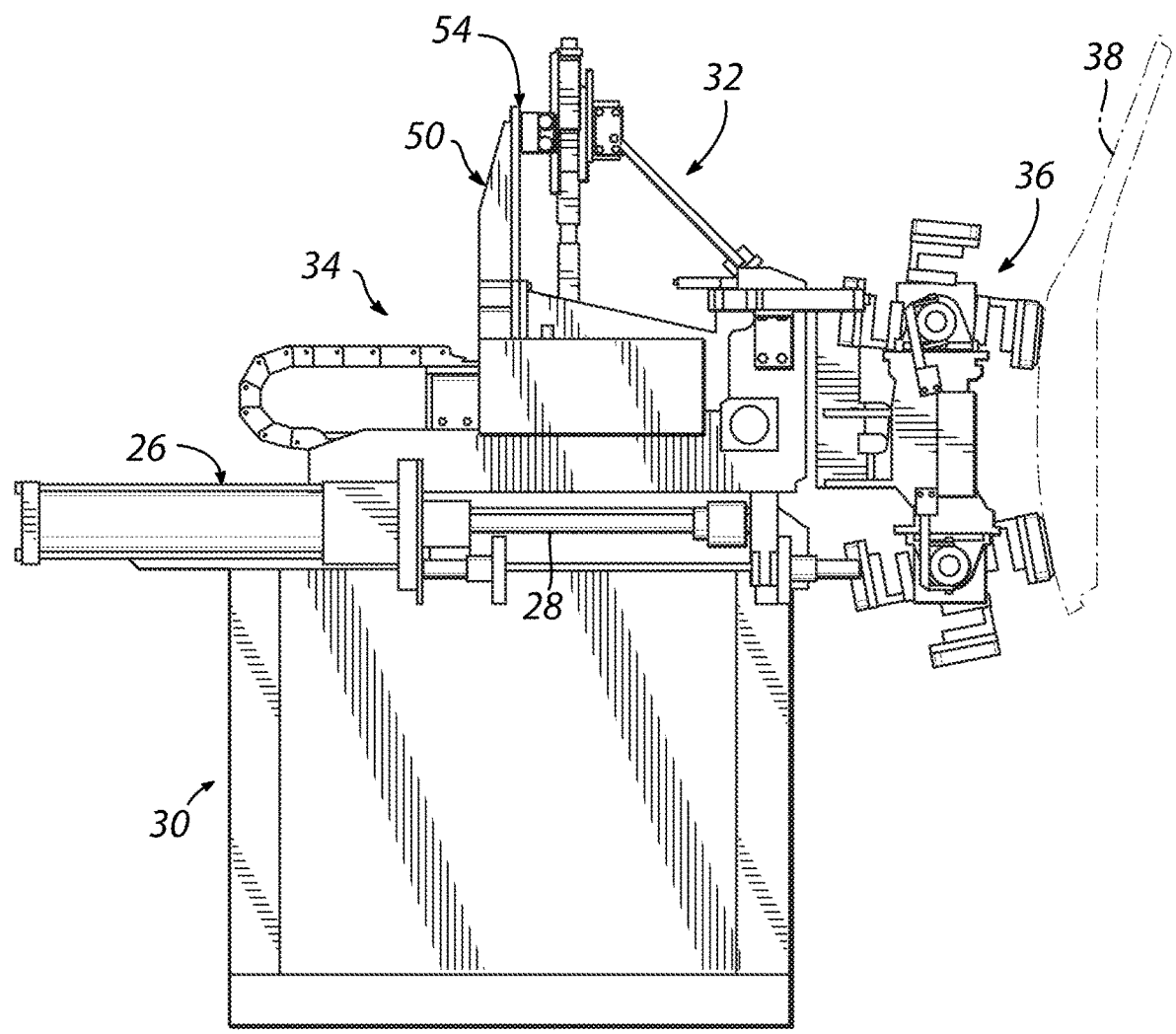
FIG. 3B is a partial elevation view, similar to FIG. 3A, and illustrating the carriage in a second position.

With continued reference to FIG. 1, and referring further to FIGS. 2, 3A, and 3B, an exemplary component handling system 12 in accordance with the principles of the present disclosure is depicted in more detail. In the embodiment shown, the component handling system 12 may be supported on a frame 30 for location within a manufacturing cell 18a and adjacent the manufacturing line 16. The exemplary component handling system 12 includes a multi-axis articulating manipulator 32 supported on the frame 30 by a carriage 34. The carriage 34 is supported on the frame 30 for movement to and between a first, retracted position that is spaced a distance away from the assembly line, as depicted in FIG. 3A, and a second, work position that is displaced from the retracted position in a direction toward the assembly line 16, as depicted in FIG. 3B. In the embodiment shown, the carriage 34 is selectively moved between the first and second positions by an actuator 26 having an extendable rod 28. It will be appreciated, however, that various other mechanisms suitable for moving the carriage 34 between the first and second positions may be used.

The exemplary component handling system 12 further includes a component mounting tool 36 coupled with the multi-axis manipulator 32 and configured to receive and support at least one component 38 for assembly to the workpiece 14. In the embodiment shown, the component 38 is illustrated as a door that is to be mounted to the vehicle body as the vehicle body moves along the assembly line 16 and is positioned adjacent the manufacturing cell 18a. While the component 38 is shown and described herein as a vehicle door, it will be appreciated that, in other embodiments, various other components may be received on the component mounting tool 36 for processing and/or assembly onto a workpiece. As non-limiting examples, automotive components such as body panels, handles, or hinges, or even non-automotive components, may be received and supported on a component mounting tool in accordance with the principles of the present disclosure.

As shown in FIG. 3A, when the carriage 34 is in the first, retracted position, the mounting tool 36 is oriented and positioned to receive a component 38, and supports the component 38 in a pose that facilitates further processing of the component 38, such as by a robotic manipulator 22a positioned adjacent the component handling system 12. As a non-limiting example of the embodiment shown, the component 38, in the form of a vehicle door, may be supported with an interior side of the door facing up to thereby facilitate the positioning and attachment of sub-components onto the door. Advantageously, the first position of the carriage 34 facilitates the loading and processing of components and sub-components while the workpiece 14 is moving between the manufacturing cells 18a-18d of the manufacturing assembly line 16, thereby providing increased efficiencies of throughput. When the carriage 34 is then moved to the second, work position as depicted in FIG. 3B, the mounting tool 36 is moved in translation with the carriage 34, and is also moved in a curvilinear manner such that the mounting tool 36 supports the component 38 in a second pose that facilitates joining the component 38 to the workpiece 14. For example, in the embodiment shown, the component 38 may be supported in a generally vertical orientation of the door corresponding to how the door will be attached to the vehicle body (workpiece 14).

The component handling system 12 may additionally be provided with various sensors for monitoring and facilitating the operation of the component handling system 12. In the embodiment shown, the system 12 may further include one or more optical sensors, or cameras 40 positioned at various suitable locations on or near the manipulator 32, the carriage 34, and/or the component mounting tool 36. The optical sensors 40 may be supported on a separate support frame 42, for example, or may be coupled with the frame 30 or other structure as may be desired. Other sensors may include, as a non-limiting examples, one or more non-contact proximity sensors 44 positioned on or near the component handling system 12 and configured to sense the presence of a workpiece 14 adjacent the component handling system 12. Other sensors may be used to confirm the presence and/or pose of a component supported on the component mounting tool 36. Signals or data obtained from the sensors 40, 44 may be provided to a controller or other suitable computer and used to control and/or monitor operation of the component handling system 12.

Figure 4:
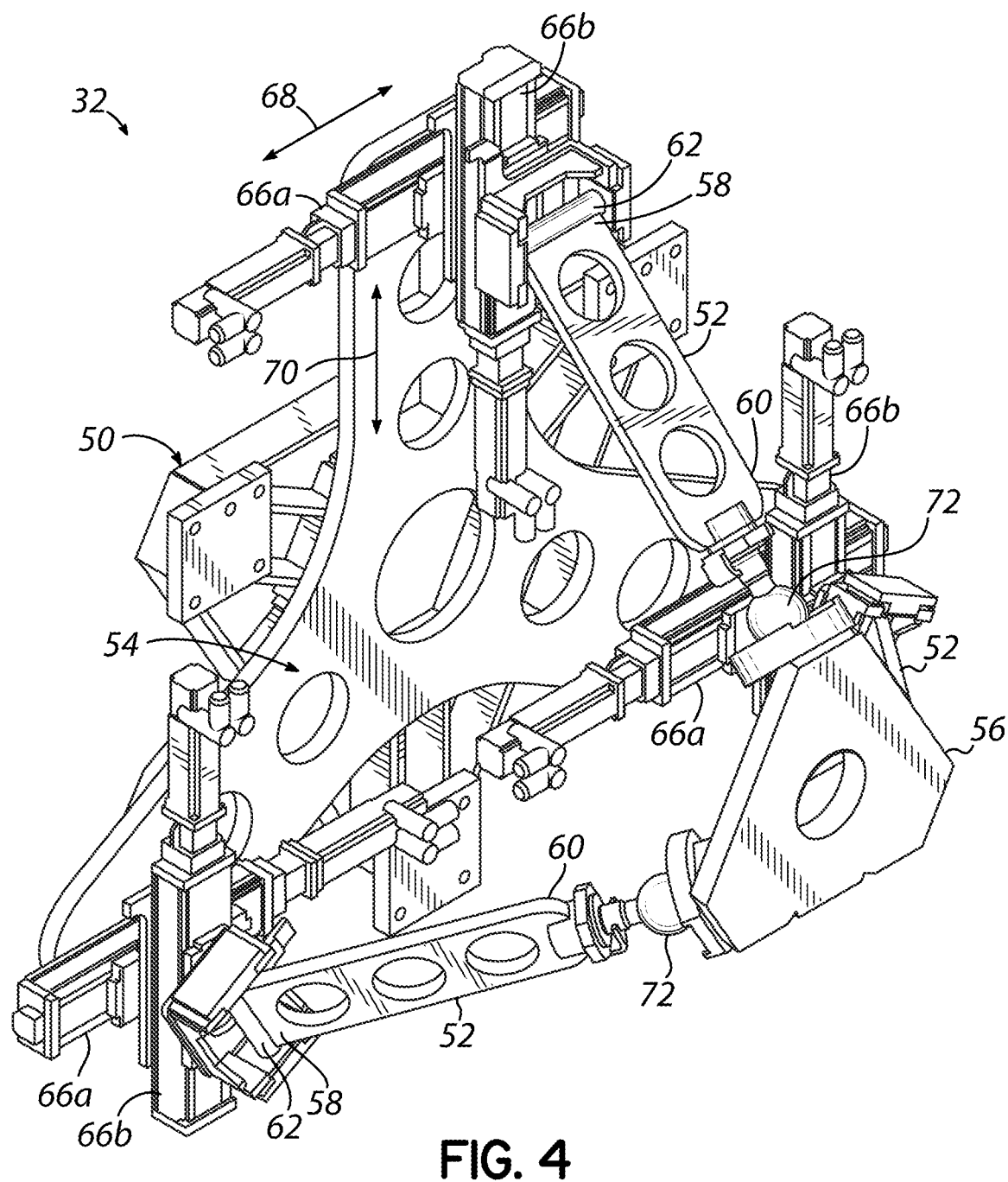
FIG. 4 is a detail perspective view of an exemplary multi-axis articulating manipulator in the system of FIG. 2 in accordance with the principles of the present disclosure.

With continued reference to FIGS. 2, 3A, and 3B, and referring further to FIG. 4, the exemplary multi-axis articulating manipulator 32 will be described in more detail. In the embodiment shown, the manipulator 32 includes a base assembly 50 coupling the manipulator 32 to the carriage 34 for movement with the carriage 34 between the first and second positions on the frame 30. A plurality of linkages 52 are coupled with a base plate 54 of the base assembly 50 and are configured to support a tool mounting plate 56 on their opposite ends for coupling with the component mounting tool 36. In the embodiment shown, the manipulator 32 includes three fixed-length linkages 52 coupled at their first ends 58 to the base plate 54, and the second ends 60 of the linkages 52 are coupled with the tool mounting plate 56. The first ends 58 of the linkages 58 are coupled to the base plate 54 by respective pivot joints 62 and at least one actuator configured to move the second ends 60 of the linkages 52 in a controllable manner. Through coordinated movement of the second ends 60 of the linkages 52, the pose (position and orientation) of the tool mounting plate 56 may be precisely controlled. In the embodiment shown, the first end 58 of each linkage 52 is coupled to the base plate 54 by a pair of linear actuators 66a, 66b that are aligned to control movement of the first ends 58 of the linkages 52 in respective first and second directions 68, 70 arranged orthogonal to one another. The second ends 60 of the linkages 52 are coupled to the tool mounting plate 56 by respective swivel joints 72 such that the pose of the tool mounting plate 56 may be controlled by selective positioning of the linear actuators 66a, 66b coupled with the respective linkages 52. In use, the multi-axis manipulator 32 facilitates precise positioning of a component 38 supported by the component mounting tool 36 that is coupled with the tool mounting plate 56 when the carriage 34 is in the second position.

When the carriage 34 is in the first position as shown in FIG. 3A, the base plate 54 of the multi-axis manipulator 32 is oriented such that the component mounting tool 36 coupled with tool mounting plate 56 is in the pose described above for receiving and supporting a component 38. As the carriage is moved from the first position to the second position, the base plate 54 pivots to an orientation such that the component mounting tool 36 coupled with tool mounting plate 56 is moved to the pose described above for joining the component 38 to the workpiece 14, as depicted in FIGS. 2 and 3B.

While the multi-axis manipulator 32 has been shown and described herein as including three, fixed-length linkages 52, and linear actuators 66a, 66b coupling the linkages 52 to the manipulator base plate 54, it will be appreciated that various other arrangements of linkages and actuators, including variable length linkages, may alternatively be used to facilitate positioning the tool mounting plate 56 at a desired pose for mounting a component 38 to a workpiece 14.

Figure 5:
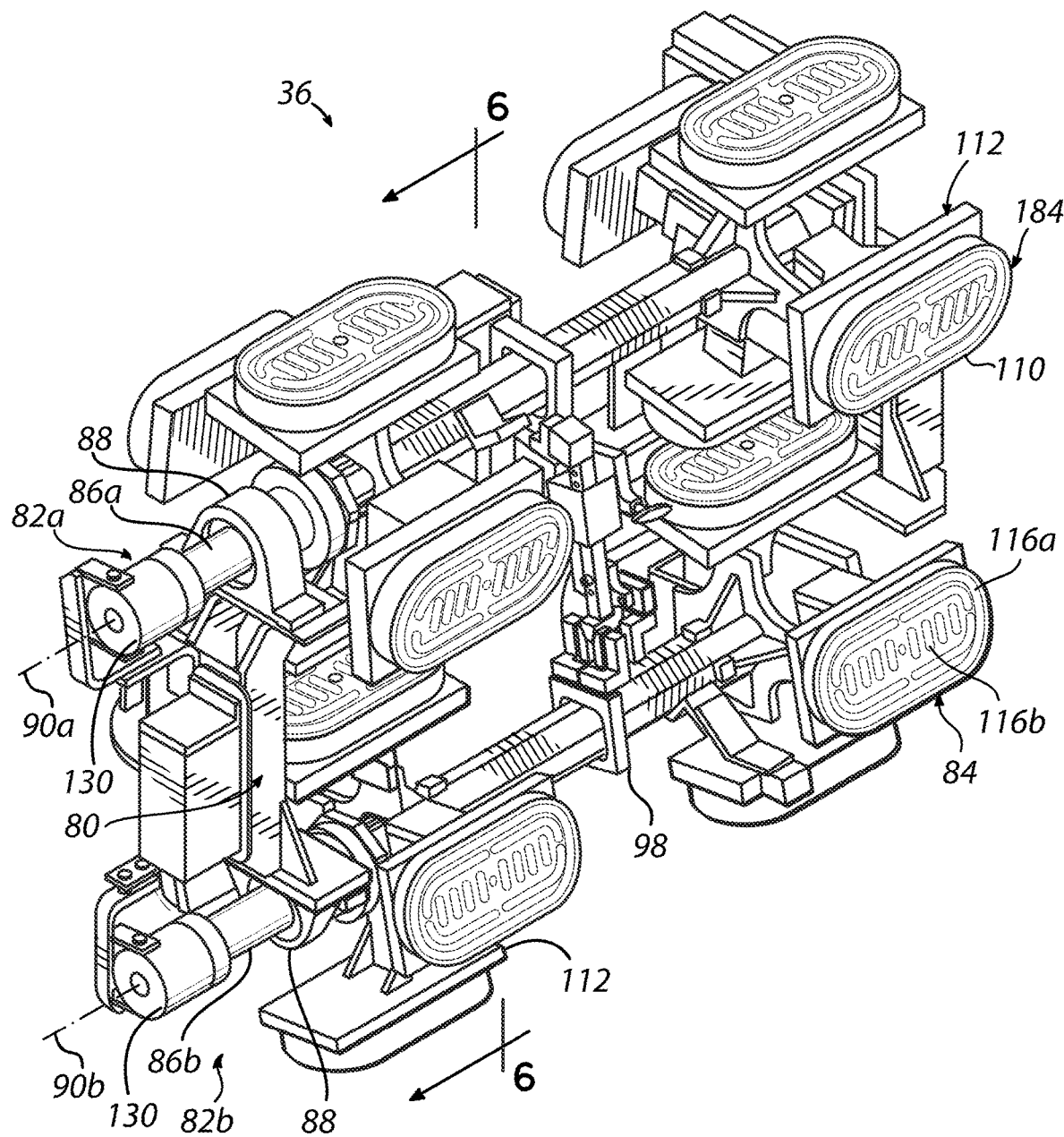
FIG. 5 is a detail perspective view of an exemplary component mounting tool in the system of FIG. 2 in accordance with the principles of the present disclosure.

With continued reference to FIGS. 2, 3A, and 3B, and referring further to FIGS. 5 and 6, an exemplary component mounting tool 36 in accordance with the principles of the present disclosure will be described. In the embodiment shown, the component mounting tool 36 includes a tool frame 80 configured to be coupled with the tool mounting plate 56 of the multi-axis manipulator 32. One or more shaft assemblies 82a, 82b are supported on the tool frame 80 and, in turn, support gripping members 84 configured to engage and support components 38 to be installed to the workpiece 14. In the embodiment shown, the mounting tool 36 includes first and second shaft assemblies 82a, 82b supported on the tool frame 80. Each shaft assembly 82a, 82b includes a shaft 86a, 86b supported for rotation relative to the tool frame 80 by respective trunnion mounts 88. Each shaft 86a, 86b may further include a plurality of gripping members 84 positioned at spaced-apart circumferential positions around the shaft 86. Advantageously, each gripping member 84 may be configured to engage components having different geometries, whereby certain ones of the gripping members 84 may be selectively positioned for engagement with components 38 to be assembled to the workpiece 14 by rotating the shafts 86 about their respective longitudinal axes 90a, 90b relative to the frame 80.

Figure 6:
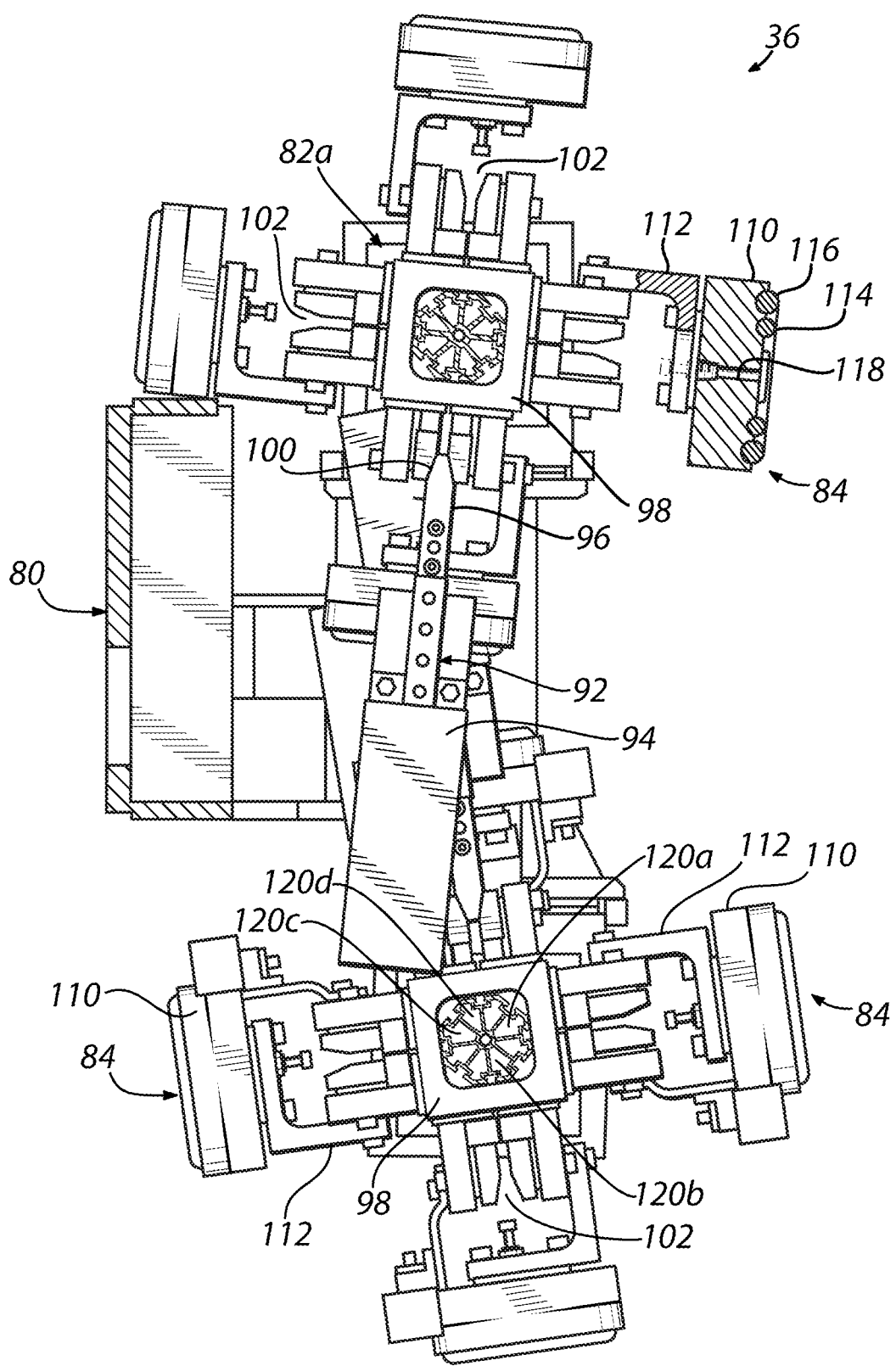
FIG. 6 is a cross-sectional view of the component mounting tool of FIG. 5, taken along line 6-6.

As best seen in FIG. 6, the component mounting tool 36 may further include a locking assembly 92 cooperating with the one or more of the shaft assemblies 82a, 82b to lock the shafts 86a, 86b at desired rotational positions so that selected gripping members 84 may be positioned for engagement with a component 38. In the embodiment shown, the locking assembly 92 includes an actuator 94 having an extendable rod 96 that engages an associated shaft assembly 82a, 82b to thereby lock the respective shaft 86a, 86b in a desired rotational position. For this purpose, each shaft assembly 82a, 82b further includes a registration block 98 supported on the shaft 86a, 86b and having registration features configured to cooperate with the rod 96 of the locking assembly actuator 94. In the embodiment shown, the distal end 100 of the rod 96 has a wedge-shaped tip, and the registration features on the registration block comprise correspondingly shaped notches 102 disposed at selected angular positions around the shaft 86a, 86b. In use, when a desired gripping member 84 is in position for engagement with a component 38, the rod 96 of the locking assembly actuator 94 may be extended to engage the corresponding notch 102 provided on the registration block 98, thereby preventing further rotation of the shaft 86a, 86b.

While the component mounting tool 36 has been shown and described herein as comprising two shaft assemblies 82a, 82b, each having a plurality of gripping members 84 disposed at spaced-apart circumferential positions, it will be appreciated that a component mounting tool in accordance with the present disclosure may alternatively comprise only a single shaft assembly, or may include more than two shaft assemblies. Moreover, when only a single type of component will be handled by the component mounting tool 36, or when the components have sufficiently uniform geometries, the component mounting tool 36 may not require a plurality of different gripping members 84 disposed circumferentially around the shaft assemblies 82a, 82b.

In the embodiment shown, the gripping members 84 of the component mounting tool 36 are configured as air handlers adapted to sealingly engage a component when vacuum pressure is supplied to the air handlers. As best shown in FIG. 6, each air handler includes a housing 110 supported on the respective shaft 86a, 86b by a bracket assembly 112. The air handler is provided with a suction face 114 having one or more sealing members 116 configured to sealingly engage the component 38, and a vacuum bore 118 formed in the housing 110 communicates with the suction face 114 to provide vacuum pressure sufficient to engage and support a component 38. The vacuum bores 118 of the respective air handlers may be coupled with a source of vacuum pressure (not shown) which may be controlled to selectively grip and release components 38.

In the embodiment shown, each shaft 86a, 86b includes at least one air passage 120a, 120b, 120c, 120d through the shaft 86a, 86b and configured to provide selective communication between the vacuum pressure source and the respective vacuum bores 118 of the air handlers, such as via respective hoses (not shown) for example. In one embodiment, one or more of the air passages 120a, 120b, 120c, 120d provided through the shafts 86a, 86b of the shaft assemblies 82a, 82b may be configured to provide selective communication between the vacuum pressure source and a selected air handler when the respective shaft 86a, 86b is rotated to a position so that the air handler is positioned to engage a component 38, while other air passages 120a, 120b, 120c, 120d through the shaft 86a, 86b are not in communication with the vacuum pressure source, whereby no vacuum pressure is provided to air handlers which are not being used to engage a component 38. In the embodiment shown, the component mounting tool 36 includes further slip rings associated with each shaft assembly 82*a*, 82*b* to provide electrical and/or vacuum pressure to the air passages 120*a*, 120*b*, 120*c*, 120*d* through the shaft 86*a*, 86*b*. An exemplary slip ring that may be used is Pneumatic Rotary Union Part No. 3004012 available from Senring Electronics Co., Ltd., in Guangdong, China.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A system for automatically handling components to be assembled onto a product on an assembly line, the system comprising:
    a frame locatable adjacent the assembly line;
    a carriage supported on the frame for movement to and between a first, retracted position spaced a distance away from the assembly line, and a second, work position displaced from the retracted position in a direction toward the assembly line;
    a multi-axis articulating manipulator supported on the carriage, the manipulator including a base coupled with the carriage and a tool mounting plate controllably movable relative to the base in at least three degrees of freedom;
    the manipulator base arranged in a first orientation when the carriage is in the first position, and pivoted to a second orientation when the carriage is in the second position; and
    a component mounting tool coupled with the tool mounting plate of the manipulator, the component mounting tool configured to receive and support at least one component for assembly to the product;
    wherein a component on the component mounting tool is supported in a pose for loading and/or processing when the carriage is in the first position, and the component is supported in a pose for joining to the product when the carriage is in the second position.

2. The system of claim 1, wherein the component mounting tool is variably configurable to support different components having differing geometries.

3. The system of claim 2, wherein the component mounting tool comprises:
    a tool frame couplable with the tool mounting plate of the manipulator;
    at least one shaft assembly supported on the tool frame;
    each shaft assembly comprising:
        at least one trunnion,
        a shaft supported on the at least one trunnion,
        at least one gripping member mounted on the shaft and actuable to supportably engage the component.

4. The system of claim 3, wherein the at least one shaft assembly comprises first and second shaft assemblies supported on the tool frame.

5. The system of claim 3, wherein:
    each shaft assembly comprises a plurality of gripping members positioned at different circumferential positions around the shaft;
    wherein gripping members positioned at different circumferential positions around the shaft are configured to engage components having different geometries; and
    each shaft is rotatable relative to the tool frame about a longitudinal axis of the shaft, whereby selected gripping members are positioned for engagement with the component by rotation of the respective shaft.

6. The system of claim 3, wherein the at least one gripping member comprises a plurality of gripping members configured as air handlers adapted to sealingly engage the component when vacuum pressure is supplied to the air handlers.

7. The system of claim 6, wherein:
    each shaft assembly comprises a plurality of air handlers positioned at different circumferential positions around the shaft;
    wherein air handlers at different circumferential positions around the shaft are configured to engage components having different geometries; and
    each shaft is rotatable relative to the tool frame about a longitudinal axis of the shaft, whereby selected air handlers are positioned for engagement with the component by rotation of the respective shaft.

8. The system of claim 7, further comprising:
    a locking assembly on the tool frame and operable to lock the shaft against rotation relative to the tool frame.

9. The system of claim 7, further comprising:
    at least one passage through the shaft and configured to provide selective communication between a vacuum pressure source and at least one air handler, whereby vacuum pressure is provided to the air handler when the air handler is positioned for engagement with the component.

10. The system of claim 1, wherein the manipulator comprises:
    at least three linkages coupled between the manipulator base and the tool mounting plate;
    each linkage having a first end pivotally coupled with the tool mounting plate;
    each linkage having a second end opposite the first end and coupled with the manipulator base for controllable movement along at least one translation axis in a plane parallel to the base.

11. The system of claim 10, wherein the at least three linkages have fixed longitudinal lengths.

12. The system of claim 10, further comprising:
    at least one actuator disposed between the second end of each respective linkage and the base.

13. The system of claim 12, wherein the at least one actuator comprises first and second actuators disposed between the second end of each respective linkage and the base.

14. The system of claim 13, wherein the first actuators associated with each linkage are linear actuators aligned to control movement of the respective second ends in a first direction, and the second actuators are linear actuators aligned to control movement of the respective second ends in a second direction orthogonal to the first direction.

15. A method of handling components to be assembled to a product on an assembly line, the method comprising:
    receiving the component on a component mounting tool at a first, retracted position spaced from the assembly line, wherein the component mounting tool is in a first pose adapted to facilitate receiving or processing the component;
    moving the component on the component mounting tool in a direction toward the assembly line to a second, work position where the component mounting tool is in second pose adapted to facilitate joining the component to the product; and at least one of:
adding sub-components to the component while the component is supported on the component mounting tool at the first position, or performing a manufacturing process on the component while the component is supported on the component mounting tool at the first position.

* * * * *